United States Patent
Lim et al.

(10) Patent No.: US 10,952,144 B2
(45) Date of Patent: Mar. 16, 2021

(54) POWER SAVING DATA RECEPTION

(71) Applicant: Apple Inc., Cupertino, CA (US)

(72) Inventors: Junsung Lim, San Jose, CA (US); Youngjae Kim, San Jose, CA (US); Johnson O. Sebeni, Fremont, CA (US)

(73) Assignee: Apple Inc., Cupertino, CA (US)

( * ) Notice: Subject to any disclaimer, the term of this patent is extended or adjusted under 35 U.S.C. 154(b) by 176 days.

(21) Appl. No.: 16/142,870

(22) Filed: Sep. 26, 2018

(65) Prior Publication Data

US 2019/0141633 A1  May 9, 2019

Related U.S. Application Data

(60) Provisional application No. 62/583,012, filed on Nov. 8, 2017.

(51) Int. Cl.
| | | |
|---|---|---|
| G08C 17/00 | (2006.01) | |
| H04W 52/02 | (2009.01) | |
| H04B 1/06 | (2006.01) | |
| H04L 29/08 | (2006.01) | |
| H04W 88/02 | (2009.01) | |
| H04W 72/04 | (2009.01) | |

(52) U.S. Cl.
CPC .......... *H04W 52/0235* (2013.01); *H04B 1/06* (2013.01); *H04L 69/324* (2013.01); *H04W 72/042* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 6,980,838 B2 | 12/2005 | Hiben | |
| 8,059,694 B2 | 11/2011 | Junell | |
| 2008/0130770 A1* | 6/2008 | Khandekar | H04L 27/3809 375/260 |
| 2014/0362756 A1* | 12/2014 | Maeda | H04L 65/4076 370/312 |
| 2016/0192368 A1* | 6/2016 | Noh | H04W 84/12 370/329 |

(Continued)

FOREIGN PATENT DOCUMENTS

WO    WO2016074185    5/2016

*Primary Examiner* — Phirin Sam
(74) *Attorney, Agent, or Firm* — Kowert, Hood, Munyon, Rankin & Goetzel, P.C.

(57) ABSTRACT

This disclosure relates to techniques for opportunistically depowering receiver chains of a wireless device. Based on received control information, a device may determine a depowering time. For example, the device may determine a minimum number of symbols of the payload channel that will provide an effective spectral efficiency less than a supportable spectral efficiency of the payload channel. The depowering time may be determined as a time upon receipt of the determined minimum number of symbols. The device may determine whether to perform a depowering procedure, based upon the determined depowering time. In response to determining to perform the depowering procedure, the device may depower an RF receiver of the device at the depowering time, wherein the depowering time is prior to the end of the payload channel. The device may decode the payload channel based on a portion of the payload channel received by the RF receiver.

20 Claims, 6 Drawing Sheets

(56) References Cited

U.S. PATENT DOCUMENTS

| | | |
|---|---|---|
| 2017/0063484 A1 | 3/2017 | Naghshvar |
| 2017/0068506 A1* | 3/2017 | Mamola .................. G10L 19/00 |
| 2018/0098295 A1* | 4/2018 | Reial .................... H04W 48/08 |
| 2018/0103437 A1* | 4/2018 | Kommi ............... H04W 52/327 |
| 2019/0158345 A1* | 5/2019 | Lincoln ................ H04B 7/0617 |

* cited by examiner

| MCS (up to 256QAM) | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|---|
| I_TBS | 0 | 2 | 4 | 6 | 8 | 10 | 11 | 12 | 13 | 14 | 15 | 16 | 17 | 18 | 19 | 20 | 21 | 22 | 23 | 24 | 25 | 27 | 28 | 29 | 30 | 31 | 32 | 33/33A |
| TBS | 256 | 424 | 696 | 1032 | 1384 | 1736 | 2024 | 2280 | 2536 | 2856 | 3112 | 3240 | 3624 | 4008 | 4264 | 4584 | 4968 | 5352 | 5736 | 5992 | 6200 | 6712 | 6966 | 7480 | 7736 | 8248 | 8504 | 9912 |
| PDCCH symbol | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| modulation | 2 | 2 | 2 | 2 | 2 | 4 | 4 | 4 | 4 | 4 | 4 | 6 | 6 | 6 | 6 | 6 | 6 | 6 | 6 | 6 | 8 | 8 | 8 | 8 | 8 | 8 | 8 | 8 |
| Num of PRB | 10 | 10 | 10 | 10 | 10 | 10 | 10 | 10 | 10 | 10 | 10 | 10 | 10 | 10 | 10 | 10 | 10 | 10 | 10 | 10 | 10 | 10 | 10 | 10 | 10 | 10 | 10 | 10 |
| Coding rate (14 symbol) | 0.097 | 0.156 | 0.25 | 0.367 | 0.489 | 0.306 | 0.356 | 0.4 | 0.444 | 0.5 | 0.544 | 0.378 | 0.422 | 0.467 | 0.496 | 0.533 | 0.578 | 0.622 | 0.667 | 0.696 | 0.54 | 0.585 | 0.607 | 0.651 | 0.674 | 0.718 | 0.74 | 0.863 |
| Coding rate (8 symbol) | 0.181 | 0.289 | 0.464 | 0.681 | 0.908 | 0.567 | 0.66 | 0.743 | 0.825 | 0.929 | 1.011 | 0.702 | 0.784 | 0.867 | 0.922 | 0.99 | 1.073 | 1.156 | 1.238 | 1.293 | 1.003 | 1.086 | 1.127 | 1.21 | 1.251 | 1.334 | 1.375 | 1.602 |
| Coding rate (9 symbol) | 0.158 | 0.253 | 0.406 | 0.596 | 0.794 | 0.497 | 0.578 | 0.65 | 0.722 | 0.813 | 0.885 | 0.614 | 0.686 | 0.758 | 0.806 | 0.867 | 0.939 | 1.011 | 1.083 | 1.131 | 0.878 | 0.95 | 0.986 | 1.059 | 1.095 | 1.167 | 1.203 | 1.402 |
| Coding rate (10 symbol) | 0.14 | 0.225 | 0.361 | 0.53 | 0.706 | 0.441 | 0.514 | 0.578 | 0.642 | 0.722 | 0.786 | 0.546 | 0.61 | 0.674 | 0.777 | 0.77 | 0.835 | 0.899 | 0.963 | 1.006 | 0.78 | 0.845 | 0.876 | 0.941 | 0.973 | 1.037 | 1.069 | 1.246 |

| MCS (up to 64QAM) | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|---|---|---|---|---|---|---|---|
| I_TBS | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 26 |
| TBS | 256 | 344 | 424 | 568 | 696 | 872 | 1032 | 1224 | 1384 | 1544 | 1736 | 2024 | 2280 | 2536 | 2856 | 3112 | 3240 | 3624 | 4008 | 4264 | 4584 | 4968 | 5352 | 4968 | 5352 | 5736 | 5992 | 6200 | 7480 |
| PDCCH symbol | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| modulation | 2 | 2 | 2 | 2 | 2 | 2 | 2 | 2 | 2 | 2 | 2 | 4 | 4 | 4 | 4 | 4 | 4 | 6 | 6 | 6 | 6 | 6 | 6 | 6 | 6 | 6 | 6 | 6 | 6 |
| Num of PRB | 10 | 10 | 10 | 10 | 10 | 10 | 10 | 10 | 10 | 10 | 10 | 10 | 10 | 10 | 10 | 10 | 10 | 10 | 10 | 10 | 10 | 10 | 10 | 10 | 10 | 10 | 10 | 10 | 10 |
| Coding rate (14 symbol) | 0.097 | 0.128 | 0.156 | 0.206 | 0.25 | 0.311 | 0.367 | 0.433 | 0.489 | 0.544 | 0.272 | 0.306 | 0.356 | 0.4 | 0.444 | 0.5 | 0.544 | 0.363 | 0.422 | 0.467 | 0.496 | 0.533 | 0.578 | 0.622 | 0.667 | 0.696 | 0.72 | 0.869 |
| Coding rate (8 symbol) | 0.181 | 0.237 | 0.289 | 0.382 | 0.464 | 0.578 | 0.681 | 0.805 | 0.908 | 1.011 | 0.506 | 0.567 | 0.66 | 0.743 | 0.825 | 0.929 | 1.011 | 0.674 | 0.784 | 0.867 | 0.922 | 0.99 | 1.073 | 1.156 | 1.238 | 1.293 | 1.338 | 1.613 |
| Coding rate (9 symbol) | 0.158 | 0.208 | 0.253 | 0.334 | 0.406 | 0.506 | 0.596 | 0.704 | 0.794 | 0.885 | 0.442 | 0.497 | 0.578 | 0.65 | 0.722 | 0.813 | 0.885 | 0.59 | 0.686 | 0.758 | 0.806 | 0.867 | 0.939 | 1.011 | 1.083 | 1.131 | 1.171 | 1.411 |
| Coding rate (10 symbol) | 0.14 | 0.185 | 0.225 | 0.297 | 0.361 | 0.449 | 0.53 | 0.626 | 0.706 | 0.786 | 0.393 | 0.441 | 0.514 | 0.578 | 0.642 | 0.722 | 0.786 | 0.524 | 0.61 | 0.674 | 0.717 | 0.77 | 0.835 | 0.899 | 0.963 | 1.006 | 1.036 | 1.041 | 1.259 |

*FIG. 7*

POWER SAVING DATA RECEPTION

PRIORITY INFORMATION

This application claims priority to U.S. provisional application Ser. No. 62/583,012 titled "Power Saving Data Reception," filed Nov. 8, 2017, which is hereby incorporated by reference in its entirety as though fully and completely set forth herein.

FIELD

The present application relates to wireless devices, and more particularly to systems, methods, and apparatuses for reducing power consumption by opportunistically depowering portions of a receiver chain.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

Mobile electronic devices may take the form of smart phones or tablets that a user typically carries. Wearable devices (also referred to as accessory devices) are a newer form of mobile electronic device, one example being smart watches. Typically, wearable devices have relatively limited wireless communications capabilities and typically have smaller batteries than larger portable devices, such as smart phones and tablets. In general, it would be desirable to reduce the power requirements of communication devices, including both wearable devices and more traditional wireless devices such as smart phones. Therefore, improvements in the field are desired.

SUMMARY

Embodiments are presented herein of, inter alia, systems, methods, and apparatuses for reducing power requirements of a wireless device by opportunistically depowering portions of a receiver chain.

A wireless device may comprise one or more receiver chains which may be used for receiving information using one or more wireless technologies. A receiver chain may comprise one or more of a baseband processor, analog/radio frequency (RF) circuitry, digital circuitry, and one or more antenna.

The wireless device may be configured to identify opportunities to depower a receiver chain during a communication session. Based on decoded control information (e.g., from a physical downlink control channel (PDCCH) and/or a physical control format indicator channel (PCFICH)), such as an allocated rank and modulation and coding scheme (MCS) associated with a payload channel (e.g., a physical downlink shared channel (PDSCH)), the wireless device may determine a depowering time based on the control information. For example, determining the depowering time may include determining, based on the control information, a minimum number of symbols of the payload channel that will provide an effective spectral efficiency that (possibly after being increased by a specified offset threshold) is less than a supportable spectral efficiency of the payload channel. The depowering time may be determined as a time upon receipt of the determined minimum number of symbols of the payload channel. The device may determine whether to perform a depowering procedure, based at least in part upon the determined depowering time. In response to determining to perform the depowering procedure, the device may depower an RF receiver of the device at the depowering time, wherein the depowering time is prior to the end of the payload channel. In response to determining not to perform the depowering procedure, the device may maintain the RF receiver in a full-power state at least until the end of the payload channel. In either case, the device may decode the payload channel based on a portion of the payload channel received by the RF receiver.

Note that the techniques described herein may be implemented in and/or used with a number of different types of devices, including but not limited to, base stations, access points, cellular phones, portable media players, tablet computers, wearable devices, and various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which:

FIG. 7 is a table of exemplary PDSCH configurations and associated effective code rates with various depowering times, according to some embodiments.

Figure 1:
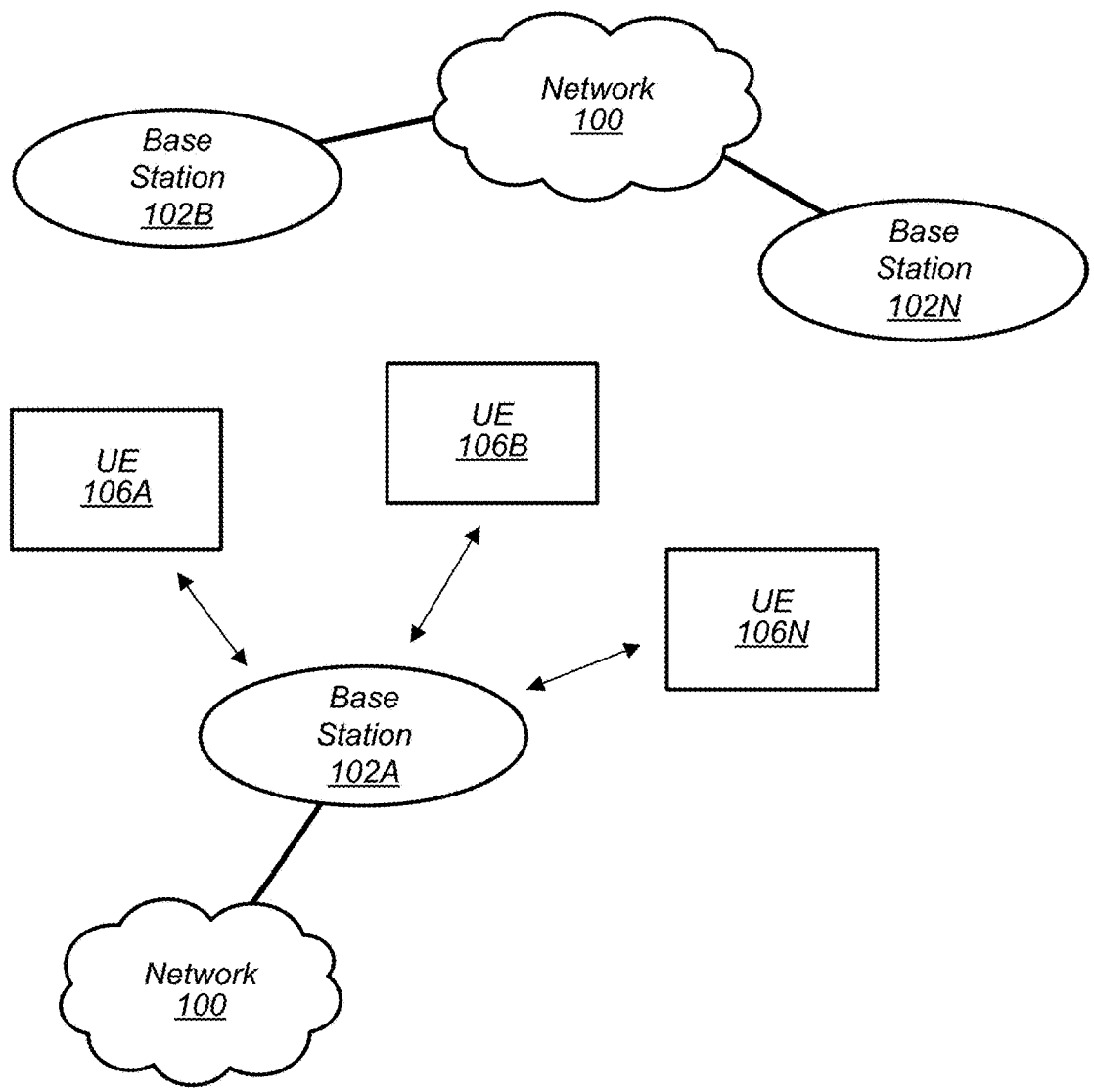
FIG. 1 illustrates an exemplary (and simplified) wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Base Station—The term "Base Station" has the full breadth of its ordinary meaning, and at least includes a wireless communication station installed at a fixed location and used to communicate as part of a wireless telephone system or radio system.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
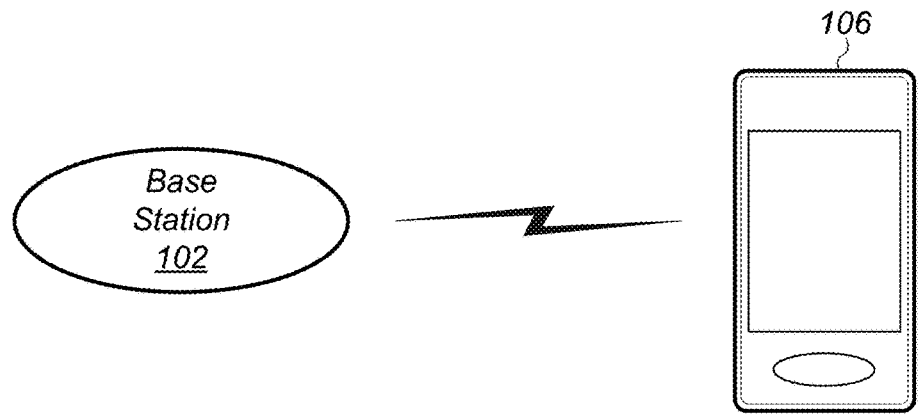
FIG. 2 illustrates a base station (BS) in communication with a user equipment (UE) device, according to some embodiments.

FIGS. 1 and 2—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), 5G NR, HSPA 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100, according to the same wireless communication technology as base station 102A and/or any of various other possible wireless communication technologies. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (WCDMA, TD-SCDMA), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above. Further, in some embodiments, the UE 106 may comprise multiple receiver chains, e.g., for MIMO communication.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or UMTS or GSM), and separate radios for communicating using each of Wi-Fi and Bluetooth. Other configurations are also possible.

Figure 3:
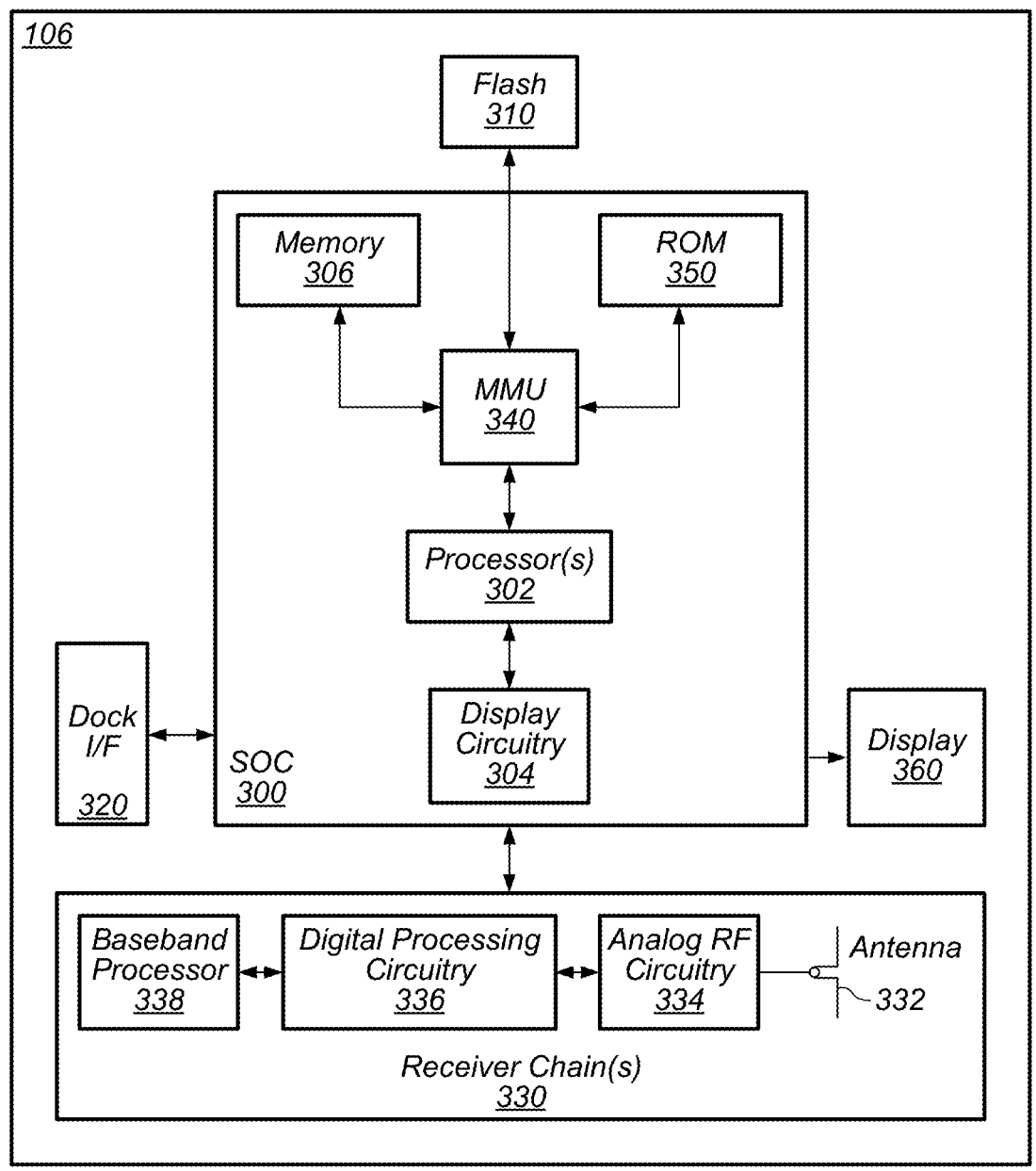
FIG. 3 illustrates an exemplary block diagram of a UE device, according to some embodiments.

FIG. 3—Exemplary Block Diagram of a UE Device

FIG. 3 illustrates one possible block diagram of a UE device, such as UE device 106. As shown, the UE device 106 may include a system on chip (SOC) 300, which may include portions for various purposes. For example, as shown, the SOC 300 may include processor(s) 302 which may execute program instructions, and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, Flash memory 310). The MMU 340 may be configured to perform memory protection and page table translation or set up. In some embodiments, the MMU 340 may be included as a portion of the processor(s) 302.

The UE device 106 may also include other circuits or devices, such as the display circuitry 304, receiver chain(s) 330, dock/connector I/F 320, and/or display 360.

In the embodiment shown, ROM 350 may include a bootloader, which may be executed by the processor(s) 302 during boot up or initialization. As also shown, the SOC 300 may be coupled to various other circuits of the accessory device 107. For example, the UE device 106 may include various types of memory, a connector interface 320 (e.g., for coupling to a computer system), the display 360, and wireless communication circuitry/receiver chain(s) 330 (e.g., for communication using cellular, Wi-Fi, Bluetooth, NFC, GPS, etc.). In some embodiments, one or more of wireless communication circuitry/receiver chain(s) 330 may perform both send and receive functions.

The UE device 106 may include at least one receiver chain 330, and in some embodiments multiple receiver chains, for performing wireless communication with base stations and/or other devices. UE device 106 may perform communications with base stations and other devices implementing different wireless technologies in some embodiments. The receiver chain 330 may include one or more antenna 332, analog RF signal processing circuitry 334, digital processing circuitry 336, and a baseband processor 338. The receiver chain 330 may be powered or depowered. Note that the term depowered as used herein may include a variety of possible states, including low power states, fully depowered states, sleep states, etc. The term powered as used herein may include a fully powered state, or a normal operational receive state. Additionally, the receiver chain 330 may be configured so that individual elements/components may be separately powered or depowered. For example, in some embodiments, it may be possible to depower analog RF circuitry 334 without affecting digital processing circuitry 336 or baseband processor 338.

For example, the UE device 106 may use antenna(s) 332 to perform the wireless communication. As noted above, the UE may in some embodiments be configured to communicate wirelessly using a plurality of wireless communication standards or radio access technologies (RATs).

As described herein, receiver chain(s) 330 may include hardware and software components for implementing embodiments of this disclosure. The receiver chain(s) 330 of the UE device 106 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

The wireless communication circuitry 330 may also include elements such as Wi-Fi Logic and Bluetooth Logic that are not illustrated. The Wi-Fi Logic may enable the UE device 106 to perform Wi-Fi communications on an 802.11 network. The Bluetooth Logic may enable the UE device 106 to perform Bluetooth communications.

As described further subsequently herein, the UE 106 may include hardware and software components for implementing features for opportunistically depowering at least a portion of the receiver chain 330, such as those features described herein with reference to, inter alia, FIG. 6. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components may be configured to implement part or all of the features described herein, such as the features described herein with reference to, inter alia, FIG. 6.

Figure 4:
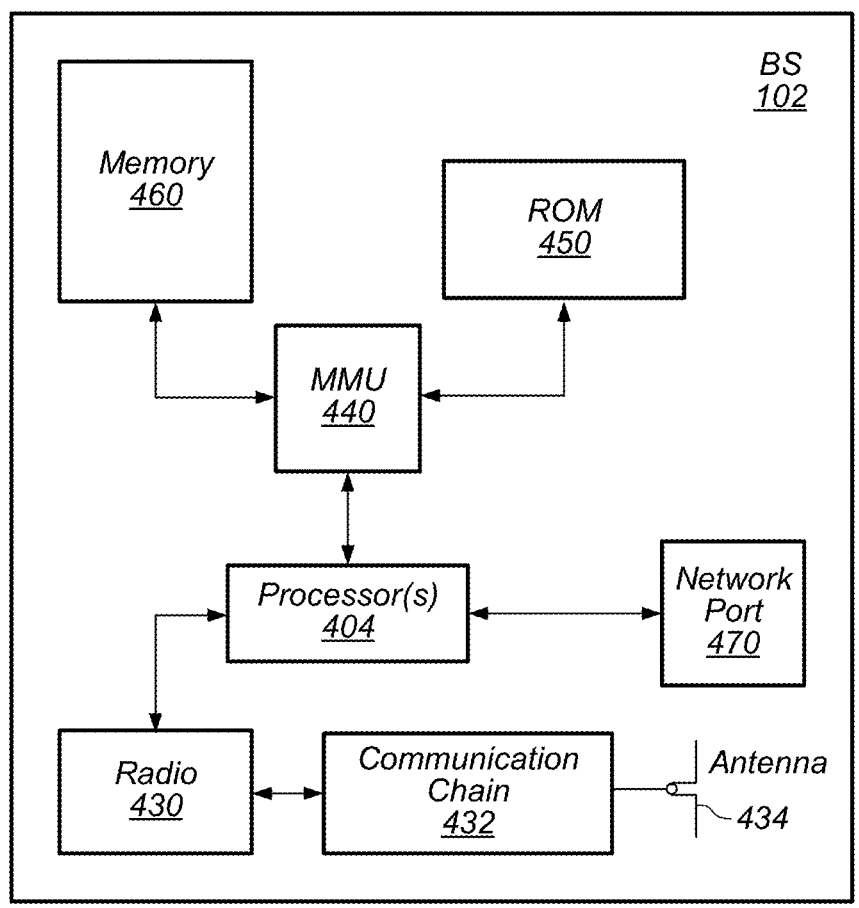
FIG. 4 illustrates an exemplary block diagram of a BS, according to some embodiments.

FIG. 4—Exemplary Block Diagram of a Base Station

FIG. 4 illustrates an exemplary block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider.

The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, Wi-Fi, etc.

The BS 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and Wi-Fi).

The BS 102 may be configured to communicate according to MIMO techniques. For example, the BS 102 may use multiple antennas 434 to communicate with UE 106 using its one or more transmit chains and/or receiver chains 330a-330nnn. For example, there may be one or more transmit chains and/or receiver chains contained within the communication chain 432. Technical standards may describe a variety of modes for communication between these devices, e.g., LTE standards may describe various transmission modes (TM) which may specify different transmission schemes for physical downlink shared channel (PDSCH) messages. For example, TM1 may utilize only a single antenna, while other (e.g., higher numbered) modes may utilize additional antennas. One or more physical downlink control channel (PDCCH) messages may include control information. The control info may include an allocated rank (e.g., rank identifier or RI) and modulation and coding scheme (MCS). The nature of the control information may differ between different transmission modes. For example, according to TM3 and TM4, a pre-coding matrix indicator (PMI), may be included, but according to TM9, PMI may not be included.

The BS 102 may include hardware and software components for implementing or supporting implementation of features described herein. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement part or all of the features described herein.

Abbreviated Reception of Data

According to some radio access technologies (RATs), communications may be received according to any of a variety of modulation and coding schemes. In some scenarios, a received communication unit (such as a subframe) may include control information including modulation and/or coding information for a payload portion (such as a payload channel) of the communication unit. For example, in LTE, a UE, such as the UE 106, may receive a subframe specifying a modulation-and-coding-scheme (MCS) value for a physical downlink shared channel (PDSCH) of the subframe. Specifically, the MCS may be included within downlink control information (DCI) within a physical downlink control channel (PDCCH) of the subframe. The MCS may specify information such as transport block size (TBS) index and modulation order of the PDSCH.

Reception and decoding of wireless communications imposes a substantial power burden upon UEs. For example, during reception and decoding of a subframe payload, such as a PDSCH, a UE may consume significant energy while receiving the RF signal, converting it to a digital signal, and performing further baseband processing. The further baseband processing may be categorized into two stages: pre-log-likelihood ratio (LLR) processing and post-LLR processing. Pre-LLR processing may include performing fast Fourier transform (FFT), channel estimation for coherent detection, and LLR derivation. Post-LLR processing may include hybrid automatic repeat request (HARD) LLR combining and decoding. Both RF and baseband processing consume significant energy.

Most communication protocols utilize modulation and coding schemes that introduce data redundancy, to allow error correction in case a portion of the signal is lost or corrupted. Different schemes provide different levels of spectral efficiency. Spectral efficiency represents the number of payload bits that may be transmitted per resource (e.g., PDSCH codeword bits per resource element (RE)). Thus, a low spectral efficiency indicates a high level of data redundancy in the form of error coding, allowing the payload to be decoded despite loss of a large portion of the signal.

In some scenarios, a base station, such as the base station 102, may specify MCS that is unnecessarily conservative, e.g., an MCS that provides greater redundancy than is needed to recover the signal given the current channel conditions. For example, in some scenarios, the granularity of resource allocations may be high relative to packet size. E.g., the minimum resource allocation size may, in some scenarios, be set to four or more physical resource blocks (PRBs), while the packet size may be small, such that the minimum resource allocation value is unnecessarily large to accommodate a payload packet. An overly conservative MCS may therefore be assigned to fill the remaining space in the allocated resources. As another example, the base station may assign a conservative MCS because it does not trust the channel condition information reported by the UE. In such scenarios, a more aggressive MCS could be specified, while still providing an acceptable likelihood of the UE being able to pass a cyclic redundancy check (CRC) and decode the payload. It has been observed that MCS is often likely to be unnecessarily conservative when traffic rates are low.

Conventionally, the UE may receive all symbols within a subframe, where PDCCH is placed in the first 1 to 4 symbols, and PDSCH follows until the end of the subframe.

Figure 5A:
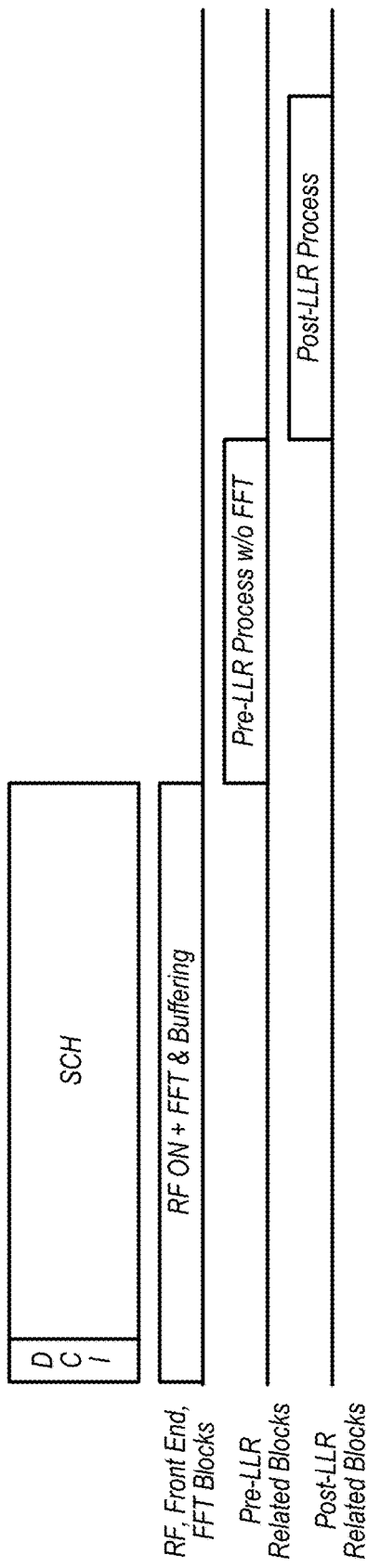
FIGS. 5A and 5B illustrate timelines of receiving and processing a subframe without and with depowering, respectively, according to some embodiments.

FIG. 5A illustrates the process of receiving and decoding a subframe in such a scenario. Specifically, FIG. 5A illustrates the functions performed by various portions of the UE (RF, front end, and FFT blocks on the top line; pre-LLR related blocks (without ("w/o") the FFT blocks) on the middle line; and post-LLR related blocks on the bottom line) while receiving a subframe, as time progresses from left to right. As illustrated, the UE receives and decodes the DCI within the PDCCH. If the DCI includes a resource assignment for the UE, then the UE also receives the PDSCH. Thus, RF circuitry, such as the analog RF circuitry 334 of FIG. 3, and additional hardware, such as an FFT module and associated buffers, remain powered to receive and process the entire PDSCH. The additional hardware may be included, e.g., in the digital processing circuitry 336 of FIG. 3. Pre-LLR processing and post-LLR processing may be performed, e.g., by the baseband processor 338 of FIG. 3, which also remains powered for a sufficient duration following the PDSCH to allow processing of the entire PDSCH.

However, when the assigned MCS is conservative, the UE may be able to decode the payload without receiving all of the PDSCH symbols. Specifically, the UE may estimate what portion of the subframe is needed to allow the UE to decode the payload, and then depower portions of the receive chain once that portion of the subframe has been received. In this way, the UE may trade coding redundancy for energy savings.

Figure 5B:
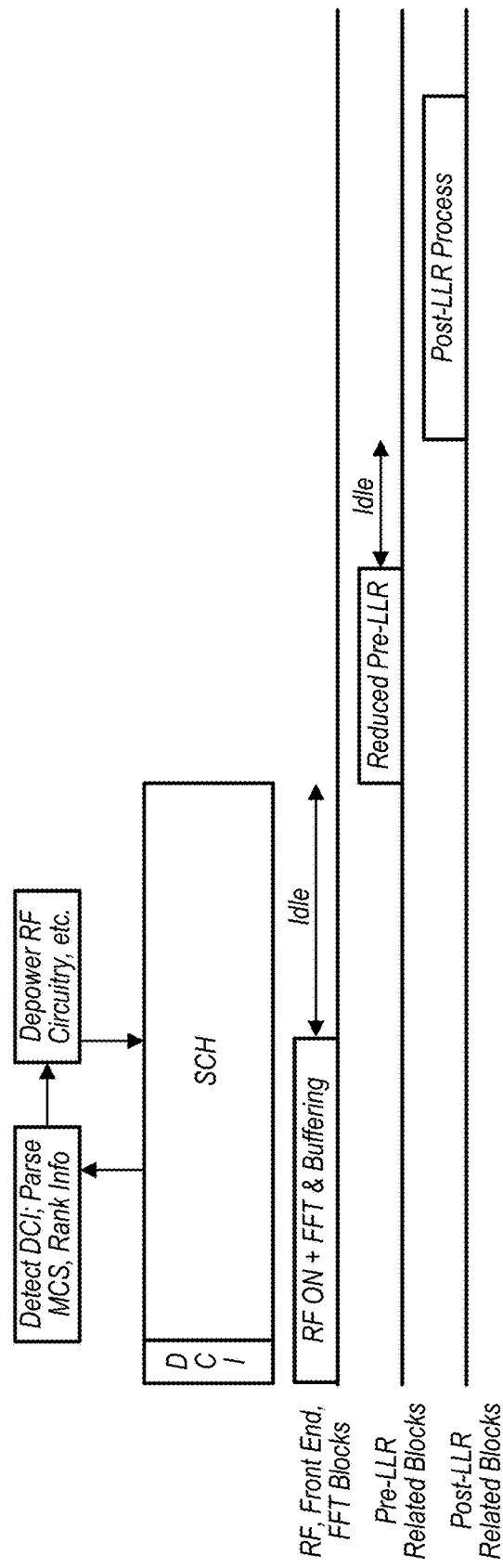

FIG. 5B illustrates such an example. As illustrated, the UE receives and decodes the DCI within the PDCCH. If the DCI includes a resource assignment for the UE, then the UE also begins to receive the PDSCH. The DCI and/or other portions of the PDCCH may also include MCS, rank information, and/or other data relevant to determining spectral efficiency assigned to the PDSCH. Based on this information, the UE may determine that the MCS is unnecessarily conservative. Specifically, the effective spectral efficiency may be lower (e.g., substantially lower) than the supportable spectral efficiency of the communication channel. In such scenarios, the payload can likely be decoded even if a portion of the signal is lost, beyond the level of loss expected based on estimated or measured channel conditions. Therefore, the UE may depower the RF circuitry prior to receiving the entire PDSCH, thus missing a portion of the signal, but saving power. Additionally, because the received signal is cut short by depowering the RF circuitry, the FFT processing and buffering may, in some scenarios, also be abbreviated, providing further power savings. For example, if the UE depowers the RF circuitry after receiving just 8 symbols of the subframe (as opposed to the full 14 symbols of the subframe), then the power used by the RF circuitry in receiving the subframe may be reduced by approximately 42.8%.

Additionally, or alternatively, the remaining pre-LLR processing may also be abbreviated. For example, when providing the PDSCH data to the baseband processor, the UE may indicate that a portion of the PDSCH data need not be processed. As a specific example, the UE may provide placeholder bits representing a portion of the PDSCH that was not received following depowering of the RF circuitry. The UE may also provide a flag or other indicator indicating that the placeholder bits do not contain necessary or meaningful data. In response to receiving the flag, the baseband processor may forego performing pre-LLR processing the placeholder bits, thus saving power. For example, if the UE performs pre-LLR processing on data representing just 8 symbols of the subframe, then the power used in pre-LLR processing may be reduced by approximately 42.8%. If the RF circuitry is also depowered after 8 symbols, then total power savings in receiving and processing the subframe may be estimated to be approximately 38% (assuming 10% power contribution for post-LLR processing).

In some scenarios, the RF circuitry may remain powered to receive the entire PDSCH, but the UE may still provide the flag indicating that some portion of the PDSCH is unnecessary. In response to receiving the flag, the baseband processor may forego performing pre-LLR processing for the indicated portion of the PDSCH, thus saving power in the baseband processor, even when the RF circuitry was not depowered.

In some scenarios, communications may utilize cross-subframe scheduling, in which a first subframe may contain control information (e.g., DCI) for one or more subsequent subframe(s). In such scenarios, the UE may determine that MCS of the subsequent subframe(s) is unnecessarily conservative based on the previously received control information. It should be appreciated that, throughout the present disclosure, any discussion of a subframe containing control information (e.g., DCI) and a payload channel (e.g., PDSCH) may also apply to scenarios utilizing cross-subframe scheduling, in which some or all of the control information pertaining to one or more payload channels may be received in a separate subframe from the payload channel(s). Thus, the UE may depower a portion of its RF receive chain (as disclosed herein) during a portion of one or more subframe(s), based on control information received during a previous subframe.

Figure 6:
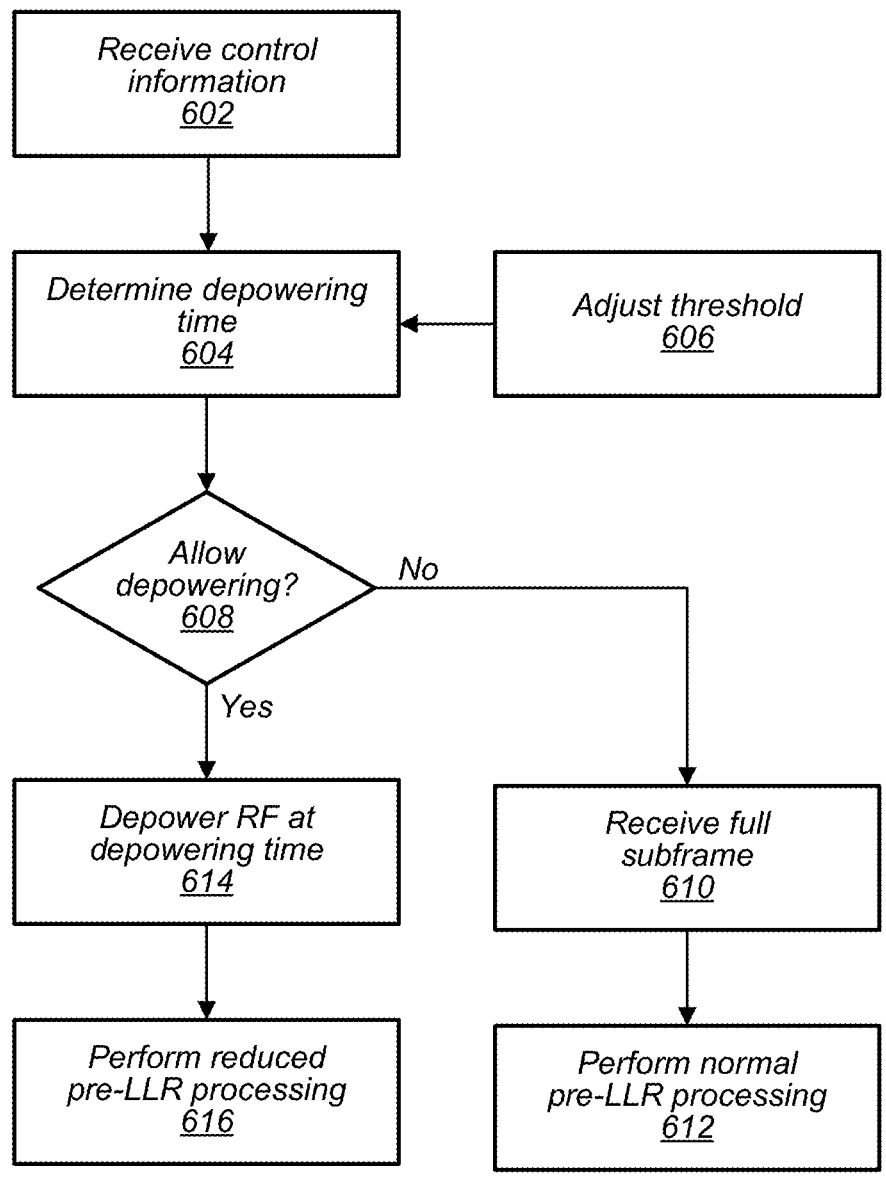
FIG. 6 is a flowchart diagram illustrating an exemplary method for receiving and processing a subframe with opportunistic power savings in receiving and processing the payload data, according to some embodiments.

FIG. 6—Flow Diagram of Opportunistic Power Savings

FIG. 6 is a flow diagram illustrating, in further detail, an example of operation of a UE receiving and processing a wireless communication unit, such as a subframe, with opportunistic power savings in receiving and processing the payload data. For convenience of description, FIG. 6 will be discussed with reference to receiving and processing an LTE subframe. However, it should be understood that the process disclosed with reference to FIG. 6 may be applied to other RATs, and is not limited to LTE. For example, references to a subframe may be generalized to any wireless communication unit, references to PDCCH may be generalized to any control channel, references to PDSCH may be generalized to any payload channel, references to DCI may be generalized to control information, etc.

At 602, a UE, such as the UE 106, may receive control information relating to the subframe being received (or one or more subsequent subframe(s)), e.g., from a base station, such as the base station 102. For example, the control information may be received in a PDCCH of the subframe. The control information may include MCS, rank information, and/or other information commonly included in the DCI. The control information may further include additional information, such as the number of PDCCH symbols included in the subframe, which information may be included, e.g., in a PCFICH of the subframe. In general, the control information may include any information that will enable or facilitate the UE to calculate spectral efficiency of a payload of the subframe (e.g., of a PDSCH). The control information may further include additional information, such as resource assignment, such as a number of physical resource blocks (PRBs) assigned to the UE in the PDSCH.

At 604, the UE may determine a depowering time. Specifically, the UE may determine a time at which to depower RF circuitry of the UE, so as to save power, while still allowing (or expecting to allow) the PDSCH to be received and decoded. The depowering time may be determined based at least in part on spectral efficiency of the PDSCH and on supportable spectral efficiency of the communication channel.

For example, the UE may calculate supportable spectral efficiency (S_SE) of the communication channel based on channel condition (e.g., CQI, SINR) measured by the UE. In some scenarios, the supportable spectral efficiency may be determined from, e.g., CQI or SINR using a look-up table. The supportable spectral efficiency may be expressed as a number of bits received successfully per RE or other data unit.

Supportable spectral efficiency may be determined per codeword. Thus, if the PDSCH has rank 1, then only one supportable spectral efficiency will be determined (S_SE(CW0)). However, if the PDSCH has rank 2, then the UE may determine a supportable spectral efficiency for each of the two codewords (S_SE(CW0) and S_SE(CW1)) for corresponding modulation orders.

The UE may further use the received configuration information to determine the effective spectral efficiency per codeword of the PDSCH upon receiving k symbols (PDSCH_SE(k)), where k is an integer equal to or less than the number of symbols in the subframe. This effective spectral efficiency represents the number of codeword bits that may be received per RE of the PDSCH, when k symbols have been received. For example, effective spectral efficiency of a given codeword upon receiving k symbols may be determined according to Equation 1:

$$PDSCH\_SE(k) = \frac{TBS + CRC}{RE(k)} \quad \text{Equation 1}$$

Here, TBS represents the transport block size in bits, which may be determined from the MCS and the number of physical resource blocks (PRB) assigned to the UE, both of which may be included in the DCI. CRC represents the number of bits used for cyclic redundancy check, which may also be determined based on the control information. RE(k) represents the number of REs used for PDSCH in the first k symbols of the subframe. RE(k) should exclude punctured REs used for purposes other than PDSCH (e.g., CRS, PSS, SSS, PDCCH, etc.). RE(k) may be determined using received control information, such as the number of PDCCH symbols, MCS, and rank information.

The effective spectral efficiency may be determined for one or more values of k, to determine values of k for which PDSCH_SE(k) is less than the supportable spectral efficiency of the communication channel. Specifically, for any value of k meeting that criterion, the UE should have a high likelihood of decoding the PDSCH after receiving only k symbols of the subframe. In some scenarios, one or more offset threshold(s) may also be introduced, e.g., to allow for a margin of error. For example, a distinct offset threshold may be defined for each rank and/or codeword (e.g., TH_rank1, TH_rank2_CW0, TH_rank2_CW1).

Thus, if the PDSCH has rank 1, the UE may have a high likelihood of decoding the PDSCH after receiving only the first k symbols of the subframe, as long as k is selected such that Equation 2 is satisfied:

$$S\_SE(CW0) > PDSCH\_SE(k) + TH\_rank1 \quad \text{Equation 2}$$

Similarly, if the PDSCH has rank 2, the UE may have a high likelihood of decoding the PDSCH after receiving only the first k symbols of the subframe, as long as k is selected such that both of Equation 3 and Equation 4 are satisfied:

$$S\_SE(CW0) > PDSCH\_SE(k,CW0) + TH\_rank2\_CW0 \quad \text{Equation 3}$$

$$S\_SE(CW1) > PDSCH\_SE(k,CW1) + TH\_rank2\_CW1 \quad \text{Equation 4}$$

Therefore, a depowering time may be determined in terms of symbols received, such that the depowering time may be specified as a time at or following reception of k symbols of the subframe, where k is selected to satisfy Equation 2, for a rank 1 PDSCH, or to satisfy Equations 3-4 for a rank 2 PDSCH. A low value of k selected for the depowering time may result in increased power savings. Thus, in some scenarios, the depowering time may be a time at or following reception of k symbols of the subframe, where k is the lowest integer value satisfying the relevant equation(s).

It should be appreciated that other (e.g., equivalent) methods could be used to determine depowering time. For example, the UE may maintain a look-up-table including values of PDSCH_SE(k) for various configurations of PDSCH. The UE may determine the configuration of PDSCH based on the received control information, and determine PDSCH_SE(k) based on the look-up-table, without calculating any of Equations 2-4.

At 606, the UE may determine or adjust the one or more offset threshold. Due to imperfections in channel estimation, and further due to differences in decoding capabilities with various decoding schemes, a depowering time may sometimes be determined incorrectly. For example, if the UE observes CRC failure for a subframe processed using RF depowering, according to the present process, this may indicate that the depowering time was calculated to be too early. By contrast, if the UE observes many consecutive CRC passes, this may indicate that the depowering time could occur earlier. Dynamically adjusting the offset thresholds may allow correction of such errors.

For example, in some scenarios, an offset threshold may be adjusted based on success or failure of CRC. Specifically, if the UE successfully decodes a rank 1 PDSCH, such that the PDSCH passes CRC, then the UE may decrease the threshold TH_rank1 by some value step_pass. If, instead, CRC fails, then the UE may increase TH_rank1 by some value step_fail.

A similar procedure may be implemented for a rank 2 PDSCH. For example, the UE may maintain a first threshold (TH_rank2_CW0) for codeword 0, and a second threshold (TH_rank2_CW1) for codeword 1. If both codewords pass CRC, then the UE may decrease each of TH_rank2_CW0 and TH_rank2_CW1 by step_pass. If either codeword fails CRC, then the threshold corresponding to that codeword may be increased by step_fail.

In this way, one or more thresholds may be dynamically adjusted for use in determining depowering time for subsequent subframes. It should be appreciated that, in other scenarios, one or more threshold may not be adjustable, or determination of the depowering time may omit the threshold(s) altogether.

At 608, the UE may determine whether to allow depowering of the RF circuitry at the determined depowering time. For example, in some scenarios, the UE may have determined the depowering time to be at or after reception of the entire PDSCH; e.g., where the lowest value of k that satisfies Equation 2 (or Equations 3-4) is equal to the total number of symbols in the subframe (e.g., 14). In such scenarios, the UE may determine to not depower the RF circuitry, e.g., because the UE may begin to receive a subsequent subframe at, or shortly after, the determined depowering time. The UE may determine to allow depowering in response to determining that the lowest value of k that satisfies Equation 2 (or Equations 3-4) is less than 14.

As another example, the UE may determine to not allow depowering in response to one or more recent CRC failures. As noted previously, CRC failure in a subframe utilizing depowering of the RF circuitry may indicate that the depowering time was estimated incorrectly. However, the base station may not be aware of such depowering, and may thus interpret CRC failure as indicating poor channel conditions. The base station may thus respond by making the MCS more conservative. To avoid this response, the UE may take steps to avoid repeated CRC failure due to depowering within a short space of time. For example, when a CRC failure occurs, the UE may disallow depowering (e.g., at 608) for a specified period, e.g., until expiration of a timer, or until a specified number of subframes pass CRC. Alternatively, the UE may avoid repeated CRC failure by temporarily increasing the one or more offset threshold (e.g., TH_rank1) by a substantial amount during the specified period. Following the specified period, the UE may return the one or more offset threshold to a value at or near the value(s) to which the one or more offset threshold was set prior to the specified period.

In response to determining, at 608, to not allow depowering, the UE may, at 610, maintain the RF circuitry in a powered state throughout reception of the subframe. E.g., the UE may receive the entire subframe according to normal procedures.

At 612, the UE may further perform full pre-LLR processing, e.g., according to normal procedures. This may include processing the entire codeword(s) of the PDSCH to produce LLR values.

In response to determining, at 608, to allow depowering, the UE may, at 614, depower RF circuitry of the UE, e.g., at the determined depowering time. The hardware to be depowered may include any/all of an antenna port, analog signal processing hardware, analog-to-digital converter (ADC) hardware, etc. In some scenarios, the hardware to be depowered may further, or alternatively, include an FFT module and associated buffers, which may be depowered once the UE stops receiving the subframe; e.g., once the RF circuitry has been depowered.

At 616, the UE may perform reduced pre-LLR processing. For example, the UE may provide (e.g., from one or more buffers) to the baseband processor a reduced data set, representing less data than the entire PDSCH; e.g., representing only the portion of the PDSCH received prior to depowering the RF circuitry at 614. In some scenarios, the reduced data set may be padded with placeholder bits (e.g., all zeros, all ones, a scramble pattern, etc.) to provide to the baseband processor a data set having a length expected for the PDSCH. In such scenarios, the UE may further provide, e.g., concurrent with the placeholder bits or with the start of the placeholder bits, a flag or other indication that the placeholder bits do not represent received data. It should be understood that the data set provided to the baseband processor "represents" a portion of the PDSCH in that the PDSCH data may have been processed, e.g., by an FFT module and/or other hardware or software, prior to being provided to the baseband processor.

Following pre-LLR processing according to either 612 or 616, the UE may perform post-LLR processing, such as decoding, according to normal procedures. For example, the CRC may be performed, the results of which may be used in connection with receiving subsequent subframes, e.g., by adjusting one or more threshold values at 606.

In some scenarios, the UE may consider effective channel code rate (CR), e.g., when determining the depowering time at 604 or when determining whether to allow depowering at 608. Effective channel code rate may be defined as a ratio of the number of information bits carried on the channel, to the total number of bits available in the channel to carry information. Thus, the effective channel code rate may be calculated according to Equation 5:

$$CR(k) = \frac{TBS + CRC}{RE(k) * Qm} \qquad \text{Equation 5}$$

Here, TBS, CRC, and RE(k) are transport block size, cyclic redundancy check bits and number of resource elements, as defined in Equation 1. Qm is the modulation order of the channel, representing the number of bits per RE, and may be determined from the MCS. By comparing Equation 5 to Equation 1, it may be observed that CR(k)=PDSCH_SE(k)/Qm.

A high code rate may lead to a high likelihood of CRC failure, as less bits remain available for redundancy bits for error coding. Thus, the UE may operate in a manner intended to maintain an effective channel code rate at or below a specified threshold (TH_CR). For example, when determining whether to allow depowering at 608, the UE may disallow depowering if the determined depowering time specifies that the RF circuitry would be depowered after receiving only k symbols, where CR(k)>TH_CR.

As another example, when determining the depowering time at 604, the UE may first determine a first value k that is the minimum value of k that will satisfy Equation 2 (or Equations 3 and 4), as discussed above. In some scenarios, the UE may then also determine a second value of k that is the minimum value of k for which CR(k)≤TH_CR. The depowering time may then be determined as a time at or following reception of k symbols of the subframe, where k is the greater of the first value of k and the second value of k.

As yet another example, the UE may maintain a lookup table based on a specified threshold value, the lookup table including certain PDSCH configurations for which depowering may be allowed/disallowed (e.g., disallowed because depowering may not be performed without resulting in CR(k)>TH_CR), and/or including minimum values of k for which depowering may be allowed. In such an example, the UE may, in some scenarios, determine, based on the received control information and the lookup table, that depowering may not be allowed. the UE may therefore forego 604, and proceed directly to 610, which may save computational resources. Alternatively, the UE may determine based on the received control information and the lookup table, a minimum value of k to be used in determining the depowering time, such that Equation 2 (or Equations 3-4) need not be calculated for smaller values of k.

FIG. 7 illustrates a table of example scenarios, with particular example values of MCS, number of PDCCH symbols, and number of PRBs. The upper table of FIG. 7 illustrates a configuration in which the MCS values may be specified up to 256QAM, while the lower table illustrates a different configuration in which the MCS values may be specified up to 64QAM. FIG. 7 further illustrates CR(k) for each set of example values, for k=14, k=8, k=9, and k=10. The value CR(14) represents the code rate without depowering. A lower value of k represents greater power savings. As can be observed from FIG. 7, a lower value of k also results in a higher effective channel code rate.

FIG. 7 illustrates the results of setting TH_CR=0.800. Specifically, for each example in which depowering at the specified value of k would result in CR(k)>0.800, the effective channel code rate has been shown with a dark gray background, while effective code rates have been shown with a light gray background for each example in which depowering at the specified value of k would result in CR(k)≤0.800.

To highlight one example, according to the upper table of FIG. 7 (MCS up to 256QAM), if MCS=4 and the number of PRBs is 10, with 1 PDCCH symbol, then the code rate without depowering would be 0.489. However, depowering after k symbols will result in a reduced effective channel code rate, as follows: CR(10)=0.706; CR(9)=0.794; CR(8)=0.908. Thus, if TH_CR=0.800, then the UE may disallow depowering upon reception of only 8 symbols. For example, if the UE determines, at 604, the depowering time to be upon reception of 8 symbols, then at 608 the UE may determine to disallow depowering, based at least in part upon a determination that CR(8)>0.800. Alternatively, the UE may, at 604, adjust the depowering time to be upon reception of 9 symbols, to allow depowering, while still maintaining CR(k)≤TH_CR. Specifically, adjusting the depowering time to be upon reception of 9 symbols would, in this example, result in an effective channel code rate greater than that the threshold value of 0.800.

To highlight a second example, according to the lower table of FIG. 7 (MCS up to 64QAM), if MCS=28 and the number of PRBs is 10, with 1 PDCCH symbol, then the code rate without depowering would be 0.869. Thus, if TH_CR=0.800, then depowering would be disallowed, as depowering with any value of k would result in CR(k)>0.800.

It may be observed from FIG. 7 that more conservative modulation-and-coding schemes (e.g., lower MSC values) may result in greater opportunities for depowering.

It should be appreciated that 0.800 is merely one example of a possible value of TH_CR, and other values may be used instead.

It should be appreciated that FIG. 6 illustrates one example of a procedure for processing a subframe, and that various modifications are envisioned. Specifically, various steps may be reordered or omitted, and/or additional steps may be included. For example, as noted above, in some scenarios, determining depowering time at 604 may be omitted, e.g., where configuration information inherently precludes depowering. As another example, in some scenarios, determining whether to allow depowering at 608 may be effectively omitted, e.g., where depowering decisions are based entirely on the determined depowering time (e.g., if depowering occurs if, and only if, the depowering time is determined to be upon reception of k symbols, where k<14). As yet another example, adjusting the threshold(s) at 606 may be omitted. As yet another example, as noted above, either of 614 or 616 may be omitted, while the other is performed, in response to determining, at 608, to allow depowering.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE) comprising:
radio frequency (RF) receiver circuitry configured to receive a wireless communication subframe; and
processing circuitry coupled to the RF receiver circuitry, the processing circuitry configured to cause the UE to:
receive control information indicating that the subframe comprises a payload channel for the UE;
determine a depowering time based on the control information, wherein the depowering time is prior to the end of the payload channel;
determine whether to perform a depowering procedure, based at least in part upon the determined depowering time;
in response to determining to perform the depowering procedure, depower the RF receiver circuitry at the depowering time;
in response to determining not to perform the depowering procedure, maintain the RF receiver circuitry in a full-power state at least until the end of the payload channel; and
decode the payload channel based on a portion of the payload channel received by the RF receiver circuitry.

2. The UE of claim 1, wherein the control information is received in a physical downlink control channel (PDCCH).

3. The UE of claim 1, wherein the payload channel is a physical downlink shared channel (PDSCH).

4. The UE of claim 1, wherein, in determining the depowering time, the processing circuitry is further configured to cause the UE to:
determine, based on the control information, an effective spectral efficiency associated with receiving a specified number of symbols of the payload channel;
determine that the determined effective spectral efficiency is less than a supportable spectral efficiency of the payload channel; and
determine the depowering time to be a time upon receipt of the specified number of symbols of the payload channel.

5. The UE of claim 1, wherein, in determining the depowering time, the processing circuitry is further configured to cause the UE to:

determine, based on the control information, a minimum number of symbols of the payload channel that will provide an effective spectral efficiency less than a supportable spectral efficiency of the payload channel; and determine the depowering time to be a time upon receipt of the determined minimum number of symbols of the payload channel.

6. The UE of claim 1, wherein, in determining the depowering time, the processing circuitry is further configured to cause the UE to:

determine, based on the control information, a minimum number of symbols of the payload channel that will provide an effective spectral efficiency that, when increased by a specified offset threshold, is less than a supportable spectral efficiency of the payload channel; and determine the depowering time to be a time upon receipt of the determined minimum number of symbols of the payload channel.

7. The UE of claim 6, wherein the offset threshold is dynamically determined based on previous occurrences of cyclic redundancy check (CRC) passage and/or failure.

8. The UE of claim 1, wherein the processing circuitry is further configured to cause the UE to:

determine log-likelihood ratio (LLR) for only the portion of the payload channel received prior to the depowering time.

9. The UE of claim 1, further comprising:
digital signal processing hardware;
wherein the processing circuitry is further configured to cause the UE to:
depower a portion of the digital signal processing hardware based on the depowering time.

10. The UE of claim 1, further comprising:
baseband processing hardware;
wherein the processing circuitry is further configured to cause the UE to:
provide to the baseband processing hardware a data set representing data received in the payload channel; and
provide to the baseband processing hardware an indication that a portion of the data set representing a portion of the payload channel occurring after the depowering time comprises placeholder values.

11. The UE of claim 10, wherein the processing circuitry is further configured to cause the UE to:
cause the baseband processing hardware to forego performing pre-log-likelihood ratio (LLR) processing of the placeholder values when processing the data set.

12. The UE of claim 1, wherein the control information is received in a separate subframe prior to the subframe comprising the payload channel.

13. A method for processing a wireless communication subframe, the method comprising:
by a user equipment device (UE):
receiving control information indicating that the subframe comprises a payload channel for the UE;
determining a depowering time based on the control information;
depowering radio frequency (RF) receiver circuitry of the UE at the depowering time, wherein the depowering time is prior to the end of the payload channel; and
decoding the payload channel based on a portion of the payload channel received prior to the depowering time.

14. The method of claim 13, wherein determining the depowering time comprises:
determining, based on the control information, an effective spectral efficiency associated with receiving a specified number of symbols of the payload channel;
determining that the determined effective spectral efficiency is less than a supportable spectral efficiency of the payload channel; and
determining the depowering time to be a time upon receipt of the specified number of symbols of the payload channel.

15. The method of claim 13, wherein determining the depowering time comprises:
determining, based on the control information, a minimum number of symbols of the payload channel that will provide an effective spectral efficiency less than a supportable spectral efficiency of the payload channel; and
determining the depowering time to be a time upon receipt of the determined minimum number of symbols of the payload channel.

16. The method of claim 13, wherein determining the depowering time comprises:
determining, based on the control information, a minimum number of symbols of the payload channel that will provide an effective spectral efficiency that, when increased by a specified offset threshold, is less than a supportable spectral efficiency of the payload channel; and
determining the depowering time to be a time upon receipt of the determined minimum number of symbols of the payload channel.

17. A non-transitory computer-readable medium storing software instructions executable by a processor of a wireless communication device, the software instructions configured to cause the wireless communication device to:
receive control information indicating that a wireless communication subframe comprises a payload channel for the wireless communication device;
determine a depowering time based on the control information, wherein the depowering time is prior to the end of the payload channel;
depower radio frequency (RF) receiver circuitry of the wireless communication device at the depowering time; and
decode the payload channel based on a portion of the payload channel received prior to the depowering time.

18. The non-transitory computer-readable medium of claim 17, wherein the software instructions are further configured to cause the wireless communication device to:
depower a portion of signal processing hardware of the wireless communication device based on the depowering time.

19. The non-transitory computer-readable medium of claim 17, wherein the software instructions are further configured to cause the wireless communication device to:
provide to baseband processing hardware of the wireless communication device a data set representing data received in the payload channel; and
provide to the baseband processing hardware an indication that a portion of the data set representing a portion of the payload channel occurring after the depowering time comprises placeholder values.

20. The non-transitory computer-readable medium of claim 19, wherein the software instructions are further configured to cause the wireless communication device to:

cause the baseband processing hardware to forego performing pre-log-likelihood ratio (LLR) processing of the placeholder values when processing the data set.

* * * * *